United States Patent [19]

Michaud-Soret

[11] Patent Number: 4,617,217
[45] Date of Patent: Oct. 14, 1986

[54] BEAM OR OTHER ELEMENT OF GREAT LENGTH OF A COMPOSITE MATERIAL POLYMERIZED UNDER HEAT AND PRESSURE

[75] Inventor: Jean A. Michaud-Soret, Paris, France

[73] Assignee: Society Nationale Industrielle Aerospatiale, France

[21] Appl. No.: 651,611

[22] Filed: Sep. 17, 1984

[30] Foreign Application Priority Data

Sep. 19, 1983 [FR] France ................................. 83 14839

[51] Int. Cl.[4] .......................... B32B 3/12; B32B 5/08; B32B 5/14; B32B 5/18
[52] U.S. Cl. .................................... 428/71; 52/309.11; 52/727; 428/76; 428/117; 428/119; 428/178; 428/309.9; 428/316.6
[58] Field of Search ................... 428/117, 119, 71, 76, 428/304.4, 316.6, 309.9, 178; 52/309.11, 727

[56] References Cited

U.S. PATENT DOCUMENTS 3,920,871 11/1975 Johnson .............................. 428/119
4,464,429 8/1984 Michaud-Soret ................... 428/117

FOREIGN PATENT DOCUMENTS 2552012 3/1985 France .

*Primary Examiner*—William J. Van Balen

[57] ABSTRACT

The beam of composite material is of the type comprising two longitudinally extending outer parallel chords interconnected by webs which are parallel to one another and perpendicular to the chords, spaces between the webs being filled with a resin foam material forming a core (8, 9). The beam further comprises prefabricated box structures (2, 14) providing a connection between the chords (6) and the core (8, 9) on each side of the webs (7), and thin metal bands disposed between two thin sheets of resin-impregnated fibers constituting heating elements (10) incorporated in the core (8, 9) in intermediate parts of the latter and disposed parallel to the webs (7) and located between the latter.

20 Claims, 3 Drawing Figures

BEAM OR OTHER ELEMENT OF GREAT LENGTH OF A COMPOSITE MATERIAL POLYMERIZED UNDER HEAT AND PRESSURE

FIELD AND BACKGROUND OF THE INVENTION

The present invention relates to the production of objects of great length composed of composite fiber materials impregnated with a resin and in particular to the manufacture of bearing beams of great length.

It is known that the manufacture of objects of great length composed of composite materials presents problems which have not been solved at the present time in a completely satisfactory manner, in particular as concerns the polymerization of the resin under heat and pressure owing to the very large size of the required molds and the control of their temperature.

The applicant has developed a method for manufacturing molds for producing objects of great length composed of composite materials, this method being disclosed in French Pat. No. 2,552,012 filed by the applicant. This application discloses a method comprising the following stages: forming a wall of a molding cavity in a plurality of parts and of a cheap material having a high thermal conductivity, applying at least one heating means in direct thermal exchange relation to an external surface of said wall, applying a thermal insulator on top of said heating means, and fixing the various wall parts on rigid mold-supports in uniform pressure transmitting relation to said wall. By means of this method it is now easy and inexpensive to produce objects of large size composed of composite materials.

Thus this method makes it possible to take full advantage of the mechanical properties of the composite materials for easily constructing for example beams and in particular elements or beams having special shapes for particular applications.

SUMMARY OF THE INVENTION

The invention therefore provides a beam of great length composed of a composite material and of the type comprising outer longitudinally extending parallel chords interconnected by webs which are parallel to each other and perpendicular to said chords, the gaps between the webs being filled with a core of a foam or plastics material, said beam including a plurality of prefabricated box structures which are disposed in contact with an inner surface of each chord, between the chords and the core of foam material, heating elements being incorporated within the core and disposed parallel to the webs, between the webs or against one or more of the webs.

Preferably, the prefabricated box structures each comprise a body or core of a foam of a hard plastics material, wrapped in a plurality of crossed layers of glass fabric whose fibers are oriented at about 45° with respect to the longitudinal axis of the beam.

Preferably, the chords are formed by a semi-product which is nonpolymerized or partly polymerized, such as that disclosed in U.S. Pat. No. 4,464,429 to the present inventor in which is disclosed a semi-finished product which is tacky to the touch and can be used to manufacture finished components, comprising: a first layer of fabric forming a base web lying in a plane and impregnated with polymerizable resin which is at most partially polymerized so that it is tacky to the touch; a plurality of distinct strips of rovings impregnated with polymerizable resin which is at most partially polymerized so as to be tacky to the touch arranged in rows and juxtaposed on said fabric lying in the same longitudinal direction; and a second layer of fabric having a rippled configuration and passing alternately above and below the juxtaposed rows of said strips, said second layer being impregnated with polymerizable resin which is at most partially polymerized so as to be tacky to the touch.

In the case of a beam whose end portions have a flattened cross-sectional shape, the core of a foam of plastics material disposed between the box structures is eliminated in the regions of the ends which are formed solely by said box structures.

Owing to the arrangement of box structures rendered integral with the core of foam material and with the chords by polymerization, the connection between the chords and the core is ensured and the assemblage has excellent properties as concerns torsional, bending and buckling strength.

The bending strength is ensured by the chords which are formed by the semi-product such as that disclosed in the aforementioned French patent application.

BRIEF DESCRIPTION OF THE DRAWINGS

Further features and advantages of the invention will appear from the following description of its application to the construction of a connecting arm for a multi-hull boat, with reference to the accompanying drawings which are given solely by way of examples and in which.

DESCRIPTION OF THE PREFERRED EMBODIMENTS

Figure 1:
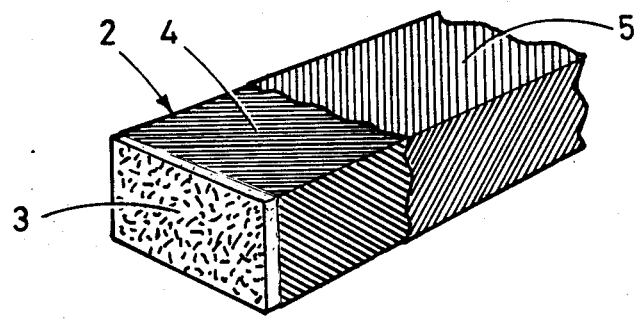
FIG. 1 is a partial perspective view of a box structure element employed for the construction of a trimaran arm.
Figure 2:
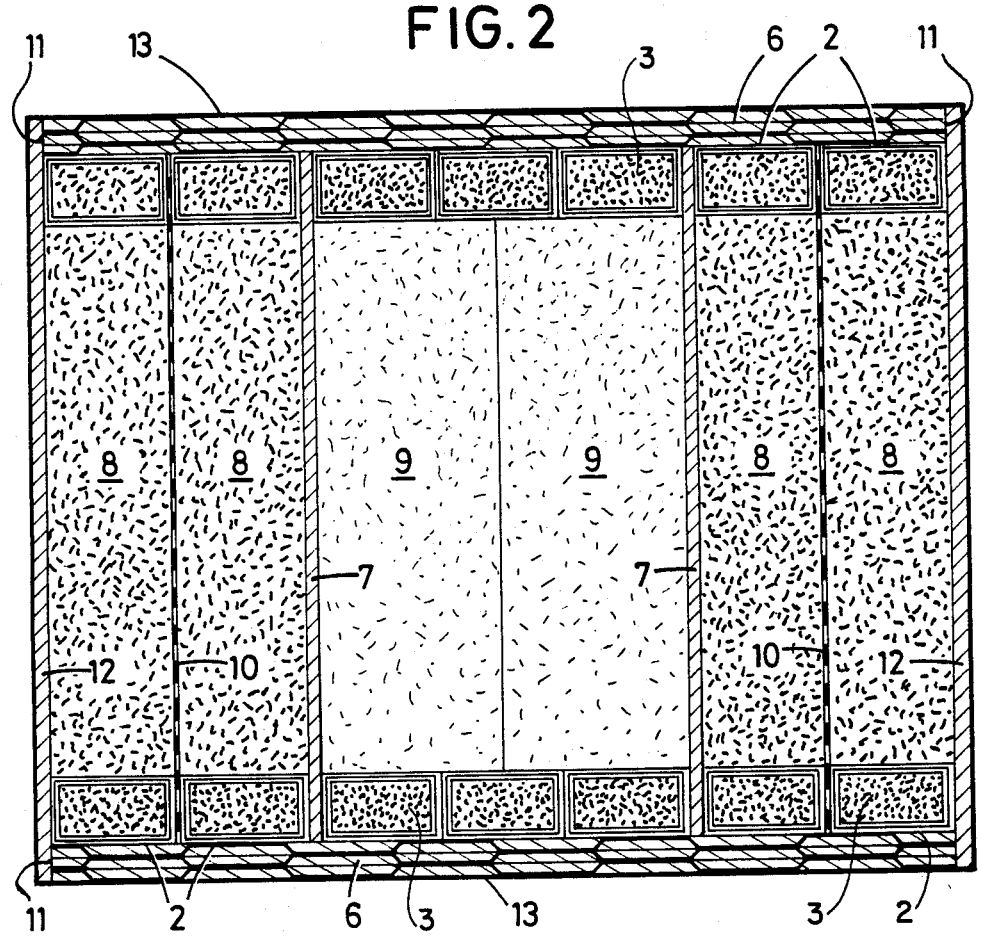
FIG. 2 is a cross-sectional view of the main part of a beam which forms an intermediate part of the trimaran arm.

With reference to the drawings, FIG. 1 shows a part of a prefabricated box structure employed in the construction of a beam or girder according to the invention.

The box structure, designated generally by the reference 2, comprises a core 3 of a hard synthetic resin foam material, for example a polyurethane foam material having a density of about 80 kg/m$^3$ which may advantageously have a roughly rectangular cross-sectional shape and around which are wound at least two superposed layers 4 and 5 of glass fabric whose threads are oriented at 45° with respect to the longitudinal axis of the core 3, these fabrics being impregnated with a resin which is polymerizable in the hot state.

The box structures 2 previously formed in this way are disposed adjacent to a chord or flange 6 constituted by a laminate of glass fibers/resin in multiple layers and, preferably according to the invention by at least three superposed layers of the semi-product disclosed in the aforementioned U.S. Pat. No. 4,464,429 which consists of adjacent rows of lamination bands disposed between two layers of glass fabric and the assemblage being impregnated with resin.

Two chords 6 constructed in this way are disposed in a mold such as that disclosed in the above French patent by the applicant, these chords being disposed in confronting relation to each other with the box structures 2 located on the inside.

Adjacent groups of box structures of the same number according to the illustrated embodiment, are separated by relatively thick parallel vertical webs 7 formed by a plurality of layers of resin-impregnated glass fabric, and the spaces between the web 7 are filled with a core 8, 9 of a resin foam material, for example polyurethane material, so that the parts 8 of the core located adjacent to the exterior are of a foam of hard resin having a density of about 80 kg/m³ for example, while the intermediate part of the core located inside is formed by a similar foam material but which is lighter and has for example a density of about 50 kg/m³.

Heating elements 10, formed in the known manner by a ribbon or other band of thin metal disposed between two thin sheets of resin-impregnated fibers, are disposed parallel to the webs 7 and distributed between the latter in such manner that the heat given off when they carry current acts in depth in a roughly uniform manner within the mass of the composite material so as to polymerize the latter.

The parallel edges 11 of the chords 6 and the outer surface of the core 8, 9 are covered with relatively thick walls 12 which have the same structure as the web 7, and the assemblage formed in this way can be covered with a layer 13 of glass fiber fabric.

The assemblage polymerized under pressure and by heating the walls of the mold and by heating the assemblage from the interior by means of the heating elements 10, constitutes a unit having multiple box structures, these box structures being principally the pre-formed box structures 2, then those formed between the box structures 2, and the web 7 and the walls 12.

In order to form a connecting arm for a multi-hull boat, for example a catamaran, the end portions of the beam, which have a reduced thickness and are both curved in the same direction, are also formed by box structures 14 formed by extensions of the corresponding box structures 2 of each chord, merged together and separated by webs which, in these end portions, must have a high strength with a smaller section and are advantageously formed by a plurality of thicknesses of the same semi-product as the chords.

Figure 3:
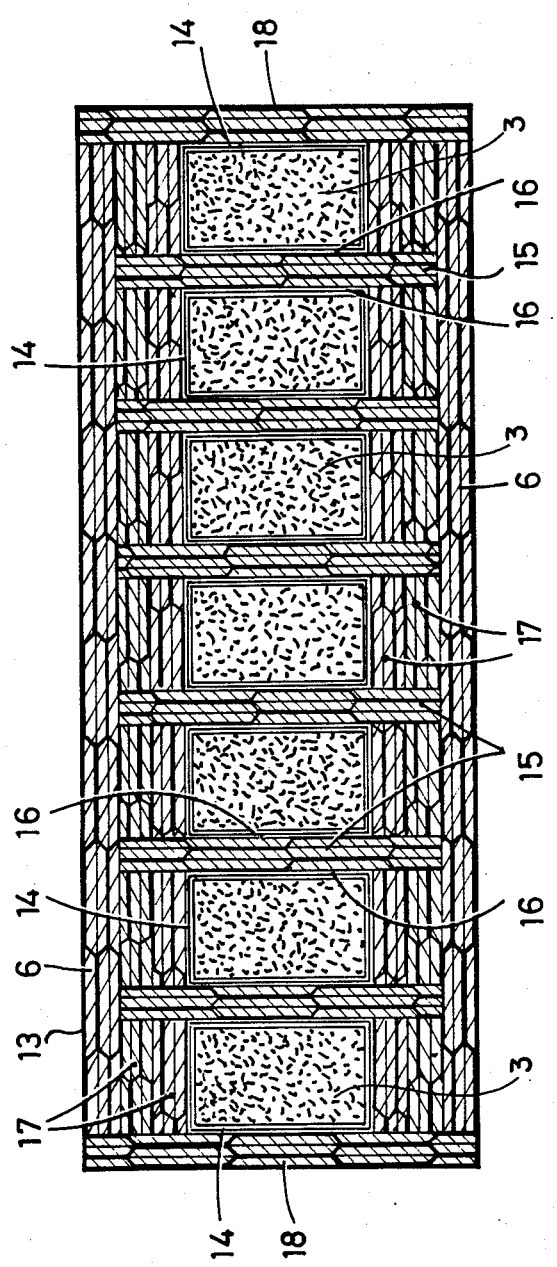
FIG. 3 is a cross-sectional view of one of the end portions of the trimaran arm constructed in accordance with the invention.

The box structures 14 (FIG. 3) are separated by thick webs each having a plurality of layers of the semi-product 15 between two layers 16 of impregnated glass fabric crossed at 45°, these webs being spaced by two series of three layers 17 of the same semi-product disposed between the box structures 14 and the chord 6. The lateral walls 18 of these end portions are advantageously identical to the webs 16, 15 and 16 and the foam material of the box structures 14 is advantageously a foam material having a high density, for example 80 kg/m³, in this end portion.

Catamaran arms constructed in this way have revealed a strength which is unequaled by conventional constructions of metal or other constructions.

The box structures 2 provide in the intermediate part the connection between the chords or flanges 6 and the webs provide high resistance to torsional stresses, while the web 7 and the lateral walls resist shear stresses and the chords 6 provide the resistance to bending stresses.

Although an embodiment has been illustrated and described in which the box structures 2 are arranged in pairs and disposed symmetrically on the two chords, it will be understood that these box structures may be arranged in a different way, for example offset, staggered or in some other arrangement. Likewise, box structures may be interposed and incorporated in the cores of resin foam material if desired, the essential feature being the arrangement of a row of prefabricated box structures on the inner side of each chord which provides the connection between the chords and the cores between the webs.

What is claimed is:

1. A beam of composite material comprising two outer longitudinally extending chords, webs which are parallel to one another, spaced apart and perpendicular to said chords and defining therebetween spaces, a core of a resin foam material filling said spaces, said webs interconnecting said two chords, said beam further comprising prefabricated box structures providing a connection between said chords and said core on each side of said webs, and thin metal bands disposed between two thin sheets of resin-impregnated fibers constituting heating elements incorporated in said core in intermediate portions of said core and disposed substantially parallel to said webs and between said webs.

2. A beam according to claim 1, wherein said prefabricated box structures are disposed in contact with an inner side of each chord between each chord and said core of foam material.

3. A beam according to claim 2, wherein each of said prefabricated box structures comprises a body of a resin foam material and at least two layers of glass fabric surrounding said body and crossed so as to be oriented at about 45° relative to a longitudinal axis of the beam and impregnated with a resin.

4. A beam according to claim 1, wherein the cords comprise a plurality of layers of prefabricated semi-product which consists of adjacent rows of laminated bands disposed between two layers of glass fabric, the laminated bands and glass fabric being impregnated with resin.

5. A beam according to claim 1, wherein the chords comprise a plurality of layers of a prefabricated semi-product which has a first layer of fabric forming a bese web lying in a plane and impregnated with polymerizable resin which is at most parially polymerized so that it is tacky to the touch, a plurality of distinct strips of rovings impregnated with polymerizable resin which is at most partially polymerized so as to be tacky to the touch arranged in rows and juxtaposed on said fabric lying in the same longitudinal direction, and a second layer of fabric having a rippled configuration and passing alternately above and below the juxtaposed rows of said strips, said second layer being impregnated with polymerizable resin which is at most partially polymerized so as to be tacky to the touch.

6. A beam according to claim 2, wherein the chords comprise a plurality of layers of a prefabricated semi-product which has a first layer of fabric forming a base web lying in a plane and impregnated with polymerizable resin which is at most partially polymerized so that it is tacky to the touch, a plurality of distinct strips of rovings impregnated with polymerizable resin which is at most partially polymerized so as to be tacky to the touch arranged in rows and juxtaposed on said fabric lying in the same longitudinal direction, and a second layer of fabric having a rippled configuration and passing alternately above and below the juxtaposed rows of said strips, said second layer being impregnated with polymerizable resin which is at most partially polymerized so as to be tacky to the touch.

7. A beam according to claim 3, wherein the chords comprise a plurality of layers of a prefabricated semi-product which has a first layer of fabric forming a base web lying in a plane and impregnated with polymerizable resin which is at most partially polymerized so that it is tacky to the touch, a plurality of distinct strips of rovings impregnated with polymerizable resin which is at most partially polymerized so as to be tacky to the touch arranged in rows and juxtaposed on said fabric lying in the same longitudinal direction, and a second layer of fabric having a rippled configuration and passing alternately above and below the juxtaposed rows of said strips, said second layer being impregnated with polymerizable resin which is at most partially polymerized so as to be tacky to the touch.

8. A beam according to claim 1, wherein said webs are maintained spaced apart by spacer elements disposed between said box structures and said chords, said spacer elements, said webs and said chords being formed by a prefabricated semi-product which has a first layer of fabric forming a base web lying in a plane and impregnated with polymerizable resin which is at most partially polymerized so that it is tacky to the touch, a plurality of distinct strips of rovings impregnated with polymerizable resin which is at most partially polymerized so as to be tacky to the touch arranged in rows and juxtaposed on said fabric lying in the same longitudinal direction, and a second layer of fabric having a rippled configuration and passing alternately above and below the juxtaposed rows of said strips, said second layer being impregnated with polymerizable resin which is at most partially polymerized so as to be tacky to the touch.

9. A beam according to claim 6, wherein said webs are maintained spaced apart by spacer elements disposed between said box structures and said chords, said spacer elements, said webs and said chords being formed by said prefabricated semi-product.

10. A beam according to claim 7, wherein said webs are maintained spaced apart by spacer elements disposed between said box structures and said chords, said spacer elements, said webs and said chords being formed by said prefabricated semi-product.

11. A beam according to claim 1, comprising lateral walls, said webs and said lateral walls being of the same material.

12. A beam according to claim 2, comprising lateral walls, said webs and said lateral walls being of the same material.

13. A beam according to claim 3, comprising lateral walls, said webs and said lateral walls being of the same material.

14. A beam according to claim 5, comprising lateral walls, said webs and said lateral walls being of the same material.

15. A beam according to claim 6, comprising lateral walls, said webs and said lateral walls being of the same material.

16. A beam according to claim 7, comprising lateral walls, said webs and said lateral walls being of the same material.

17. A beam according to claim 8, comprising lateral walls, said webs and said lateral walls being of the same material.

18. A beam according to claim 11, wherein said core of resin foam material comprises an intermediate portion and two outer portions, said outer portions having a foam material having a density which is higher than the density of the foam material of said intermediate portion.

19. A beam according to claim 18, further comprising an outer coating of glass fabric.

20. A connecting arm for a multi-hull boat comprising a beam of composite material which comprises two outer longitudinally extending chords, webs which are parallel to one another, spaced apart and perpendicular to said chords and defining therebetween spaces, a core of a resin foam material filling said spaces, said webs interconnecting said two chords, said beam further comprising prefabricated box structures providing a connection between said chords and said core on each side of said webs, and thin metal bands disposed between two thin sheets of resin-impregnated fibers constituting heating elements incorporated in said core in intermediate portions of said core and disposed substantially parallel to said webs and between said webs.

* * * * *